(12) United States Patent
Shani et al.

(10) Patent No.: US 10,102,105 B2
(45) Date of Patent: Oct. 16, 2018

(54) DETERMINING CODE COMPLEXITY SCORES

(71) Applicant: HEWLETT PACKARD ENTERPRISE DEVELOPMENT LP, Houston, TX (US)

(72) Inventors: Inbar Shani, Yehud (IL); Ohad Assulin, Yehud (IL); Yaron Burg, Yehud (IL)

(73) Assignee: ENTIT SOFTWARE LLC, Sunnyvale, CA (US)

(*) Notice: Subject to any disclaimer, the term of this patent is extended or adjusted under 35 U.S.C. 154(b) by 40 days.

(21) Appl. No.: 15/302,759

(22) PCT Filed: Jun. 24, 2014

(86) PCT No.: PCT/US2014/043855
§ 371 (c)(1),
(2) Date: Oct. 7, 2016

(87) PCT Pub. No.: WO2015/199656
PCT Pub. Date: Dec. 30, 2015

(65) Prior Publication Data
US 2017/0031800 A1    Feb. 2, 2017

(51) Int. Cl.
*G06F 9/44*       (2018.01)
*G06F 11/34*    (2006.01)
(Continued)

(52) U.S. Cl.
CPC ............ *G06F 11/3608* (2013.01); *G06F 8/77* (2013.01); *G06F 11/34* (2013.01); *G06F 11/3604* (2013.01); *G06F 11/3616* (2013.01)

(58) Field of Classification Search
CPC .......... G06F 8/70–8/77; G06F 11/3604; G06F 11/3616; G06F 11/3676
See application file for complete search history.

(56) References Cited

U.S. PATENT DOCUMENTS 5,930,798 A * 7/1999 Lawler ................... G05B 17/02
                                                              707/694
6,651,244 B1 * 11/2003 Smith ....................... G06F 8/75
                                                              714/38.1
(Continued)

FOREIGN PATENT DOCUMENTS

WO       WO-0023881 A1    4/2000

OTHER PUBLICATIONS

Jay et al., Cyclomatic Complexity and Lines of Code: Empirical Evidence of a Stable Linear Relationship, published by Scientific Research, 2009, pp. 1-7.*

(Continued)

*Primary Examiner* — Geoffrey St Leger
*Assistant Examiner* — Zheng Wei (57) ABSTRACT

In one example of the disclosure, code lines for a software program are received, the code lines including a unit of code lines. Code entities within the unit are identified. Each code entity includes a line or consecutive lines of code implementing a distinct program requirement or defect fix for the program. Context changes are identified within the unit, each context change including an occurrence of a first code line set implementing an entity, adjacent to a second code line set implementing another entity, within a same code scope. A code complexity score is determined based upon counts of entities identified and context changes identified within the unit, and upon counts of code lines and entities within the program.

19 Claims, 7 Drawing Sheets

(51) Int. Cl.
*G06F 11/36* (2006.01)
*G06F 8/77* (2018.01)

(56) References Cited

U.S. PATENT DOCUMENTS

| | | | |
|---|---|---|---|
| 6,658,643 B1* | 12/2003 | Bera | G06F 8/70 714/E11.22 |
| 7,055,129 B2* | 5/2006 | Ball | G06F 11/3616 714/E11.22 |
| 7,739,652 B2 | 6/2010 | Lake | |
| 7,861,229 B2* | 12/2010 | Lammel | G06F 8/10 707/634 |
| 8,495,581 B2 | 7/2013 | Choppakatla et al. | |
| 8,527,965 B2* | 9/2013 | Cifuentes | G06F 11/3604 717/124 |
| 8,627,287 B2 | 1/2014 | Fanning et al. | |
| 8,856,725 B1* | 10/2014 | Anderson | G06F 8/75 717/103 |
| 9,064,052 B1* | 6/2015 | Bienkowski | G06F 11/3604 |
| 9,235,494 B2* | 1/2016 | Gautam | G06F 11/3616 |
| 9,448,792 B2* | 9/2016 | Narasimhan | G06F 11/008 |
| 9,652,224 B2* | 5/2017 | Hey | G06F 8/70 |
| 2003/0033586 A1* | 2/2003 | Lawler | G06F 8/20 717/101 |
| 2004/0046763 A1* | 3/2004 | Ball | G06F 11/3616 345/581 |
| 2007/0044075 A1* | 2/2007 | Koning | G06F 8/70 717/122 |
| 2007/0220486 A1 | 9/2007 | Lammel et al. | |
| 2008/0320457 A1* | 12/2008 | King | G06F 11/3616 717/146 |
| 2009/0138843 A1* | 5/2009 | Hinton | G06F 8/74 717/101 |
| 2009/0144698 A1* | 6/2009 | Fanning | G06F 8/75 717/120 |
| 2009/0259989 A1* | 10/2009 | Cifuentes | G06F 11/3604 717/110 |
| 2010/0287109 A1 | 11/2010 | Li et al. | |
| 2010/0318980 A1* | 12/2010 | Gulwani | G06F 11/3604 717/160 |
| 2011/0022551 A1* | 1/2011 | Dixon | G06F 11/3616 706/12 |
| 2011/0066558 A1 | 3/2011 | Bassin et al. | |
| 2011/0067009 A1 | 3/2011 | Hosokawa et al. | |
| 2011/0197176 A1 | 8/2011 | Muharsky et al. | |
| 2012/0246170 A1 | 9/2012 | Iantorno | |
| 2013/0311968 A1 | 11/2013 | Sharma | |
| 2014/0282406 A1* | 9/2014 | Narasimhan | G06F 11/008 717/124 |
| 2016/0342503 A1* | 11/2016 | Narasimhan | G06F 11/008 |

OTHER PUBLICATIONS

Coverity, "Coverity Save," (Web Page), retrieved on Jul. 8, 2014, 2 pages, available at http://www.coverity.com/products/coverity-save.html.

International Search Report & Written Opinion received in PCT Application No. PCT/US2014/043855, dated Jan. 30, 2015, 9 pages.

Jetbrains, "Code Quality Analysis," (Web Page), retrieved on Jul. 8, 2014, 14 pages, available at http://www.jetbrains.com/resharper/features/code_analysis.html?gclid=CLPkieHZtroCFcs-MgodiyYApg.

Kalb, G. E., "Counting Lines of Code, Confusions, Conclusions, and Recommendations," Briefing to the 3rd Annual REVIC User's Group Conference, Jan. 10-12, 1990, 33 pages.

Nebulon, "The Original FDD Processes," (Web Page), Feb. 1, 2002, 7 pages, available at http://www.nebulon.com/articles/fdd/originalprocesses.html.

Olabiyisi S.O. et al., "Using Software Requirement Specification as Complexity Metric for Multi-paradigm Programming Languages," (Research Paper), Mar. 2013, 8 pages, available at http://www.ijetae.com/files/VolumeIssue3/IJETAE_0313_96.pdf.

Product Arts, "Value vs Complexity—A Prioritization Framework," (Web Page), Product Arts—Product Management Articles, Feb. 11, 2009, 4 pages, available at http://www.product-arts.com/articlelink/1049-value-vs-complexity-a-prioritization-framework.

Sonarsource, "SonarQube," (Web Page), retrieved on Jul. 8, 2014, 2 pages, available at http://www.sonarqube.org/.

Tak, N. et al., "Generation of a New Complexity Dimension Scheme for Complexity Measure of Procedural Program," (Research Paper), Mar. 16, 2013, pp. 259-264, available at http://www.ijcsit.com/docs/Volume%204/Vol4Issue2/ijcsit20130402016.pdf.

Turner, C. R., "Feature Engineering of Software Systems," (Research Paper), University of Colorado, 1999, 175 pages, available at http://citeseer.ist.psu.edu/viewdoc/download;jsessionid=A2FAECBCF56DE67BE834CBDAB9E11286?doi=10.1.1.113.2471&rep=rep1&type=pdf.

Wkipedia, "Software Metric,", (Web Page), retrieved on Jul. 8, 2014, 4 pages, available at http://en.wikipedia.org/wiki/Code_Metrics.

* cited by examiner

DETERMINING CODE COMPLEXITY SCORES

BACKGROUND

Code metrics, sometimes also referred to as software metrics, are measures of properties of a software application. A code metric can be a dynamic metric (measuring the execution of code) or a static metric (exploring a code base and making measurements without execution of the code). Such code metrics can be useful tools in tracking and managing software project expectations, progress, quality, and flexibility. For instance, software developers and quality assurance teams can utilize code metrics to assess code quality and stability of a code base, and to predict scope and cost of future coding efforts to upgrade or maintain the code base.

DETAILED DESCRIPTION

INTRODUCTION: A widely used code metric for tracking and managing software project expectations, progress, quality, and flexibility is a code complexity metric. Measuring code complexity may include a combination of static code analysis techniques that estimate the variance level of execution paths, inputs, outputs and other aspects of a written code unit. These static aspects are helpful to quantify how difficult it may be to understand or revise the code.

A drawback of existing code complexity metrics is that in determining the metric a code base is typically evaluated as a coherent unified mass, without an ability to effectively consider contexts relative to the code in making code complexity assessments. In reality new lines of code are frequently introduced to an existing code base for various reasons, such as implementing new functionality, fixing issues with existing functionality, or even removing functionality all together. The outcome of the addition of new lines of code over time and in different contexts in some cases can be a crisscross code of various user stories and defect fixes, causing developers difficulty in understanding, modifying and re-using code.

To address these issues, various embodiments described in more detail below provide a system and a method to determine code complexity scores in a manner that effectively takes into consideration circumstances and context for lines of code included within an evaluated code base. In an example, code lines for a software program, including a specific unit of code lines, are received. A plurality of code entities are identified within the unit of code lines. Each of the code entities includes a line of code, or consecutive lines of code, that implement a distinct program requirement or defect fix for the program relative to the other code entities. Context changes within the code unit are identified. Each context change includes an occurrence of a first code line set implementing an entity, adjacent to a second code line set implementing another entity, with the first and second code line sets both being positioned within a same code scope. A code complexity score is determined. The code complexity score is a score based upon a count of entities identified within the unit of code lines, a count of context changes identified within the unit of code lines, a count of code lines within the program, and a count of entities within the program.

In this manner, examples described herein may present an automated and efficient manner to determine code complexity scores that account for the context of the program code being evaluated, e.g., why the code was written and how the code evolved over time. Disclosed examples will enable generation and communication of code rework recommendations to be sent to developer programs and/or developer computing devices, for the benefit of developer users. Examples described herein may apply relevancy filters to identify relevant code entities from within from a set of code entities in the code unit, thus providing a means for filtering out irrelevant entities, e.g. entities implemented in past releases, non-functional entities from entity data such that the filtered out entities are not considered in the calculation of complexity scores. User satisfaction with development software programs and other development products and services that utilize the examples described herein should increase. Likewise, user satisfaction with the software programs developed utilizing the examples described herein, and with the computing devices upon which such software programs are executed or displayed, should increase.

The following description is broken into sections. The first, labeled "Environment," describes an environment in which various embodiments may be implemented. The second section, labeled "Components," describes examples of various physical and logical components for implementing various embodiments. The third section, labeled "Illustrative Example," presents an example of determining code complexity scores. The fourth section, labeled "Operation," describes steps taken to implement various embodiments.

Figure 1:
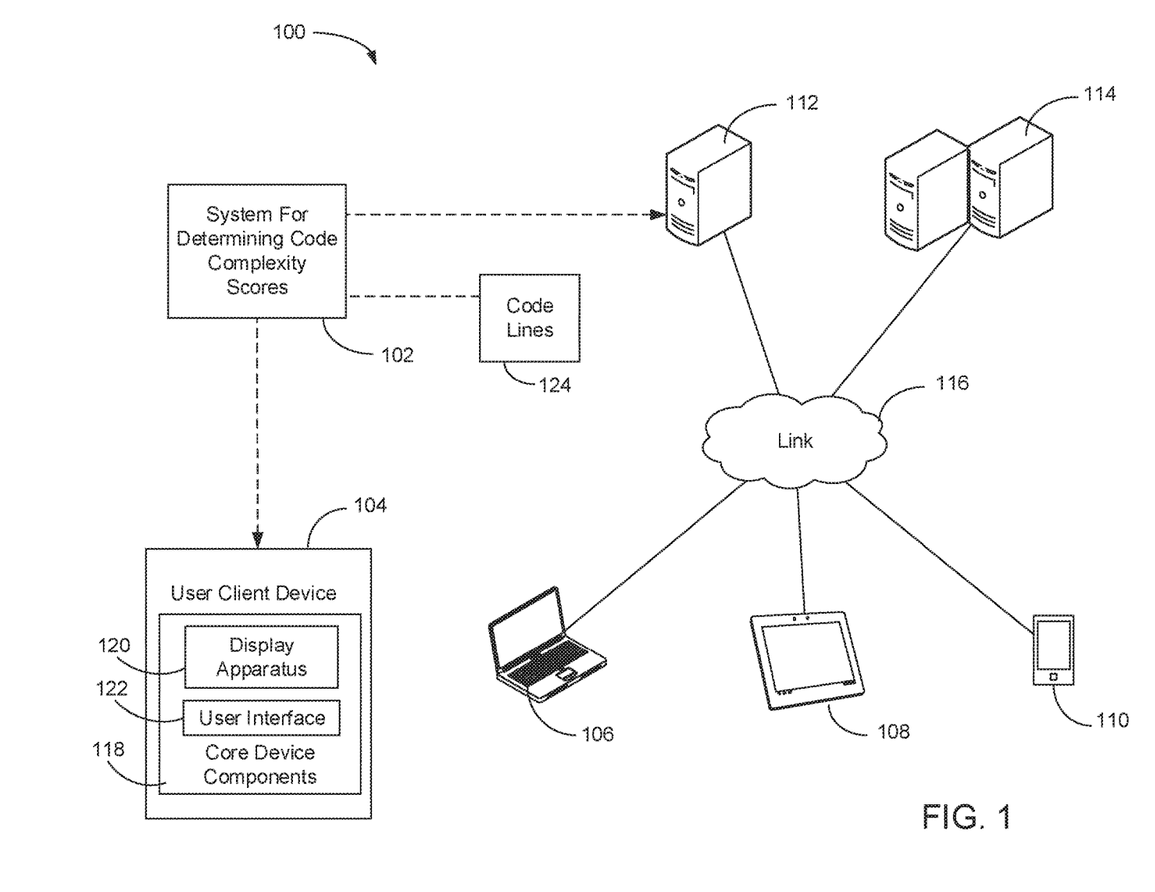
FIG. 1 is a block diagram depicting an example environment in which various embodiments may be implemented.

ENVIRONMENT: FIG. 1 depicts an example environment 100 in which embodiments may be implemented as a system 102 to determine code complexity scores. Environment 100 is show to include computing device 104, client devices 106, 108, and 110, server device 112, and server devices 114. Components 104-114 are interconnected via link 116.

Link 116 represents generally any infrastructure or combination of infrastructures configured to enable an electronic connection, wireless connection, other connection, or combination thereof, to enable data communication between components 104 106 108 110 112 114. Such infrastructure or infrastructures may include, but are not limited to, one or more of a cable, wireless, fiber optic, or remote connections via telecommunication link, an infrared link, or a radio frequency link. For example, link 116 may represent the internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106-110 represent generally any computing device with which a user may interact to communicate with other client devices, server device 112, and/or server devices 114 via link 116. Server device 112 represent generally any computing device configured to serve an application and corresponding data for consumption by components 104-110. Server devices 114 represent generally a group of computing devices collectively configured to serve an application and corresponding data for consumption by components 104-110.

Computing device 104 represents generally any computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming configured to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming configured to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming configured to enable determination of code complexity scores. In an example, system 102 is to receive and/or identify a code line set for a software program, the code line set including a subset unit of code lines. System 102 is to identify code entities within the unit of code lines, with each code entity including a code line or consecutive code lines that implement a distinct program requirement or defect fix for the program relative to the other code entities. System 102 is to identify context changes within the unit of code lines. Each of the identified context changes is a separate occurrence of a first code line set that implements a code entity, adjacent to a second code line set that implements a separate code entity, with the first and second code lines sets appearing within a same code scope. System 102 is to determine a code complexity score according to a formula that includes a count of code entities identified within the code lines unit, a count of context changes identified within the code lines unit, a count of code lines within the software program, and a count of code entities within the software program.

In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114. In a particular example, components that implement receipt and identification of a program code line set and a unit code line set that is a subset of the program code line set, and that implement identification of code entities and context changes within the unit code line set, may be included within a server device 112. Continuing with this particular example, a component that implements determination of a code complexity score based upon counts of entities and context changes identified within the unit code line set, and upon counts of code lines and entities within the program, may be a component included within computing device 104. Other distributions of system across computing device 104, client devices 106-110, server device 112, and server devices 114 are possible and contemplated by this disclosure. It is noted that all or portions of the system 102 to determine code complexity scores may also be included on client devices 106, 108 or 110.

Figure 2:
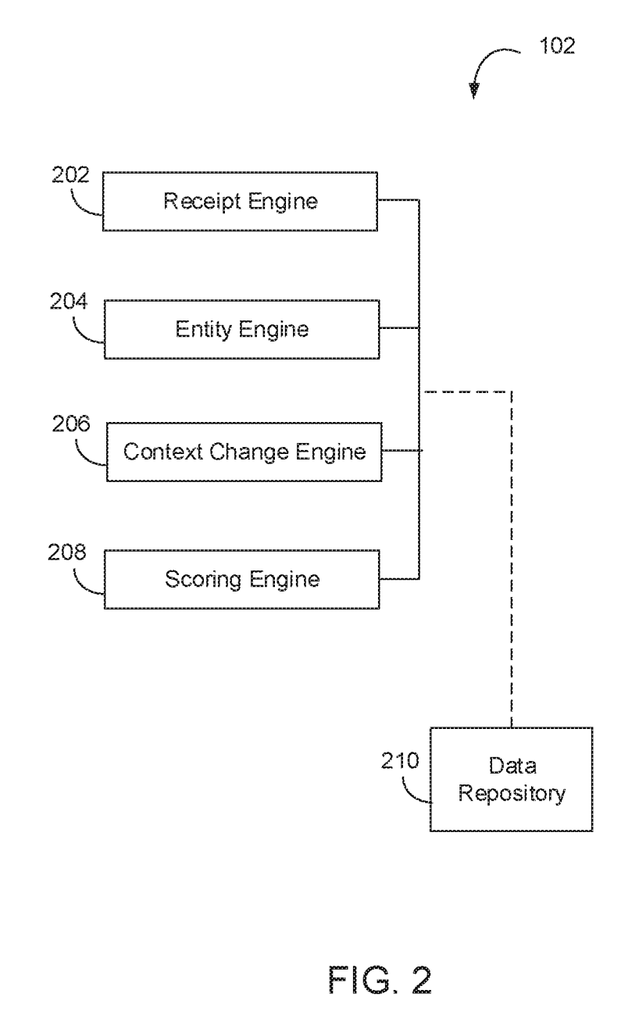
FIG. 2 is a block diagram depicting an example of a system to determine code complexity scores.
Figure 3:
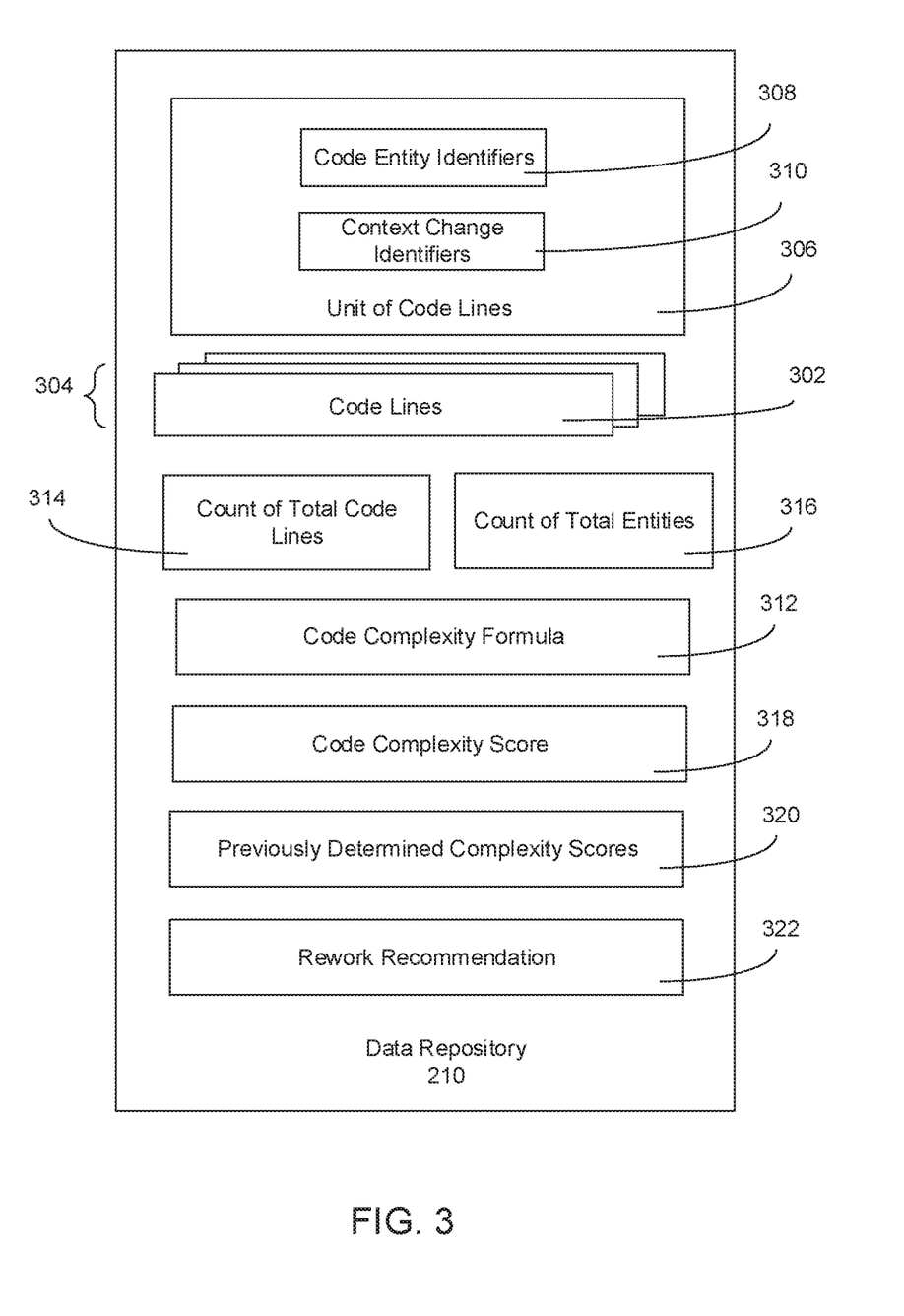
FIG. 3 is a block diagram depicting an example data structure for a system to determine code complexity scores.
Figure 4:
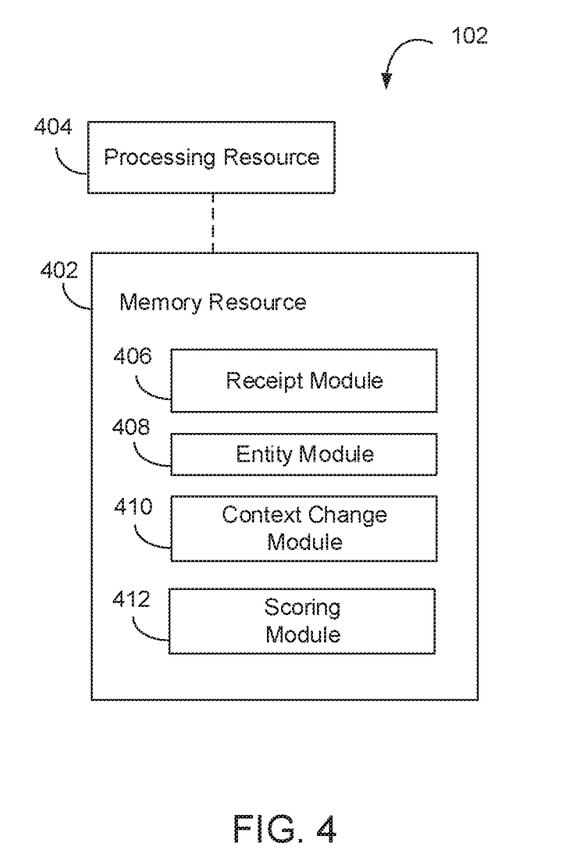
FIG. 4 is a block diagram depicting a memory resource and a processing resource according to an example.

COMPONENTS: FIGS. 2, 3, and 4 depict examples of physical and logical components for implementing various embodiments. In FIG. 2 various components are identified as engines 202 204 206 208. In describing engines 202 204 206 208 focus is on each engine's designated function. However, the term engine, as used herein, refers generally to a combination of hardware and programming configured to perform a designated function. As is illustrated later with respect to FIG. 4, the hardware of each engine, for example, may include one or both of a processor and a memory, while the programming may be code stored on that memory and executable by the processor to perform the designated function.

FIG. 2 is a block diagram depicting components of a system 102 to determine code complexity scores. In this example, system 102 includes receipt engine 202, entity engine 204, context change engine 206, and scoring engine 208. In performing their respective functions, engines 202 204 206 208 may access data repository 210. Repository 210 represents generally any memory accessible to system 102 that can be used to store and retrieve data.

In an example, receipt engine 202 represents generally a combination of hardware and programming configured to receive and/or identify a set of code lines for a software program (e.g., all code lines for a program), including a subset unit of code lines. As used herein, a "software program" refers to a sequence of instructions written to perform a specified task with a computer. As used herein, a "software program" may be system software (e.g. firmware or operating system programming) or application software (e.g. a web application or other application designed to assist a user with accomplishing a task or activity). As used herein, a "unit" of code lines refers generally to a subset of a larger set of code lines (e.g., larger set of code lines that this the totality of all code lines for a software program). In an example, the received set of code lines for the program is a set of consecutive code lines, and the unit of code lines is a unit of consecutive code lines.

As used herein, a "code line" or "line of code" refers generally to a line, row, or other increment of computer instructions (possibly with comments) written using a human-readable computer language, e.g., as text source code. In an example, references to a "code line" or "line of code" may refer to a line, row, or other segment of code that is executable. In another example, references to a "code line" or "line of code" may refer to a line, row, or other segment of code that is not a programming comment. In another example, references to a "code line" or "line of code" may refer to a line, row, or other segment of code according to a particular programming language. In another example, references to a "code line" or "line of code" may refer to a line, row, or other segment of code according to a definition that may be applied across multiple programming languages. In another example, references to a "code line" or "line of code" may refer to a line, row, or other segment of code as presented utilizing a common or consistent source code viewer program. In yet another example, references to a "code line" or "line of code" may refer to a line, row, or other segment of code as counted at a particular milestone in the software development process.

Entity engine 204 represents generally a combination of hardware and programming configured to identify a plurality of code entities within the unit of code lines. Each of the identified code entities includes a line or consecutive lines of code that implements distinct program requirement or defect fix for the program relative to the other identified code entities. In examples, the distinct requirement may be, but is not limited to, a customer requirement, an operational deployment requirement, a performance requirement, an architectural or structural requirement, a system behavioral requirement, a functional requirement, or a design requirement. In examples, the defect fix may be to correct any error, flaw, failure, fault, bug, or weakness in a computer program or system that causes it to produce an incorrect or unexpected result, or to behave in unintended ways. In a particular example, the defect fix may be to correct a defect or weakness in source code or design of a computer program.

In one example, entity engine 204 may access metadata tags within the code unit and identify an entity based upon a determination that a portion of the code unit implements a distinct program requirement or defect fix. In another example, entity engine 204 may access developer comments within the code unit and identify an entity based upon a determination that a portion of the code unit implements a distinct program requirement or defect fix.

Context change engine 206 represents generally a combination of hardware and programming configured to identify context changes within the unit of code lines. As used herein a "context change" refers generally to an occurrence of a first code line set that implements a first entity, with the first code line set being adjacent to a second code line set that implements another entity, with the first and second entities situated in a same code scope. As used herein, a "code scope" refers generally to defined region within a software program. In examples, context change module 206 may, in identifying a "same code scope", consider a same method scope, a same class scope, a same loop scope, or a same closure scope, or another same programming scope. As used herein, a "code line set" can refer to a specific code line, or grouping of consecutive code lines.

Scoring engine 208 represents generally a combination of hardware and programming configured to determine a code complexity score based at least in part upon the following factors: a count of entities identified within the unit of code lines, a count of context changes identified within the unit of code lines, a count of code lines within the software program, and a count of entities within the program. In a particular example, scoring engine 208 may access a database that includes previously determined code complexity scores, and determine a rework recommendation based upon a comparison of a currently determined complexity score to the previously determined scores. In examples, scoring engine 208 may cause sending of a determined complexity score, and/or rework recommendation to a developer software application or to a developer computing device.

In examples receipt engine 202 may receive code lines and the scoring engine may send determined complexity scores or rework recommendations to a software application (e.g. a software development application), or to a computing device configured to execute a software development application (herein a "developer computing device") via a networking protocol. In examples, the networking protocol may include, but is not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

FIG. 3 depicts an example implementation of data repository 210. In this example, data repository 210 includes code lines 302, software program 304, and a unit of code lines 306, the unit of code lines including code entity identifiers 308 and context change identifiers 310. Data repository 210 additionally includes code complexity formula 312, count of total code lines 314, count of total entities in the application 316, code complexity score 318, previously determined complexity scores 320, and rework recommendation 322.

Referring back to FIG. 3 in view of FIG. 2, in one example, receipt engine 202 (FIG. 2) receives, e.g., from a computing device via a network 116 (FIG. 1), and identifies code lines 302 representing all of the code lines for a software program 304. Receipt engine 202 identifies a unit 306 of code lines that is a subset of the totality of code lines 302 for the software program 304.

Continuing with the example data repository 210 of FIG. 3 in view of FIG. 2, entity engine 204 identifies, via detection of the code entity identifiers 308, a plurality of code entities within the code lines. Each entity identified includes or may be defined as a line or consecutive lines of code implementing a distinct program requirement or defect fix for the program. For instance, receipt engine 202 may identify within the code unit 306 a first code entity that implements a "Requirement A", a second code entity that implements a "Requirement B", a third code entity that implements a "Defect Fix X", and a fourth code entity that implements a "Defect Fix Y."

Continuing with the example data repository 210 of FIG. 3 in view of FIG. 2, context change engine 206, identifies context changes within the unit 306 of code lines, e.g., via detection of the context change identifiers 310. In this example, each context change includes or may be defined as an occurrence of a first code line set implementing an entity, adjacent to a second code line set implementing another entity, within a same code scope. It can be assumed in the example of FIG. 3 that the context change engine 206 operates to identify context changes within a same method scope. In an example, each time that context change engine 206 identifies an occurrence of a code line set implementing a first entity along with a code line set that implements any second entity that is distinct from the first entity, all within a same method scope, that occurrence would be counted as a context change. In an example, context change engine 206 identifies all code entities and context changes within the unit 306 of code liens, and also evaluates the rest of the code lines 302 of the software program 304 to determine a count of the total number of code lines 314 in the software program 304, and the total number of entities 316 identified in the software program 304.

Continuing with the example data repository 210 of FIG. 3 in view of FIG. 2, scoring engine 208 determines a code complexity score 318 based upon a count of the number of code entities identified within the code lines unit 306, a count of the context changes identified within the code lines unit 306, a count of the total number of code lines 314 within the software program 304, and a count of the total number of code lines 314 within the software program 304.

In a particular example, scoring engine 208 may determine the code complexity score 318 based upon the formula $$\text{code complexity} = (E_n * S_n)/(LOC * E_t).$$

In this example, "$E_n$" is the count of code entities identified in the code unit 306, "$S_n$" is the count of context changes identified within the code unit 306, "LOC" is the count of total lines of code identified within the software program 304, and "$E_t$" is the count of total entities identified within the program 304.

Continuing with the example data repository 210 of FIG. 3 in view of FIG. 2, scoring engine 208 may be configured to access a set of previously determined code complexity scores. In this manner scoring engine may compare a first or current code complexity score (e.g. the score determined by the scoring engine as described in the preceding paragraph) to the set and determine a "rework recommendation" based upon a comparison of the current score to the previously determined scores suggestive that the first or current code score reveals an unacceptable degree of complexity to an average or target complexity tolerated as suggested by the previously determined scores. Similarly, scoring engine 308 may determine a "no rework needed" recommendation based upon a comparison that is suggestive that the first or current code score reveals an acceptable degree of complexity compared an average or target complexity tolerated as suggested by the previously determined scores.

In the foregoing discussion of FIGS. 2-3, engines 202 204 206 208 were described as combinations of hardware and programming. Engines 202 204 206 208 may be implemented in a number of fashions. Looking at FIG. 4 the programming may be processor executable instructions stored on a tangible memory resource 402 and the hardware may include a processing resource 404 for executing those instructions. Thus memory resource 402 can be said to store program instructions that when executed by processing resource 404 implement system 102 of FIGS. 1 and 2.

Memory resource 402 represents generally any number of memory components capable of storing instructions that can be executed by processing resource 404. Memory resource 402 is non-transitory in the sense that it does not encompass a transitory signal but instead is made up of more or more memory components configured to store the relevant instructions. Memory resource 402 may be implemented in a single device or distributed across devices. Likewise, processing resource 404 represents any number of processors capable of executing instructions stored by memory resource 402. Processing resource 404 may be integrated in a single device or distributed across devices. Further, memory resource 402 may be fully or partially integrated in the same device as processing resource 404, or it may be separate but accessible to that device and processing resource 404.

In one example, the program instructions can be part of an installation package that when installed can be executed by processing resource 404 to implement system 102. In this case, memory resource 402 may be a portable medium such as a CD, DVD, or flash drive or a memory maintained by a server from which the installation package can be downloaded and installed. In another example, the program instructions may be part of an application or applications already installed. Here, memory resource 402 can include integrated memory such as a hard drive, solid state drive, or the like.

In FIG. 4, the executable program instructions stored in memory resource 402 are depicted as receipt module 406, entity module 408, context change module 410, and scoring module 412. Receipt module 406 represents program instructions that when executed by processing resource 404 may perform any of the functionalities described above in relation to receipt engine 202 of FIG. 2, Entity module 408 represents program instructions that when executed by processing resource 404 may perform any of the functionalities described above in relation to entity engine 204 of FIG. 2. Context change module 410 represents program instructions that when executed by processing resource 404 may perform any of the functionalities described above in relation to context change engine 206 of FIG. 2. Scoring module 412 represents program instructions that when executed by processing resource 404 may perform any of the functionalities described above in relation to scoring engine 208 of FIG. 2.

Figure 5:
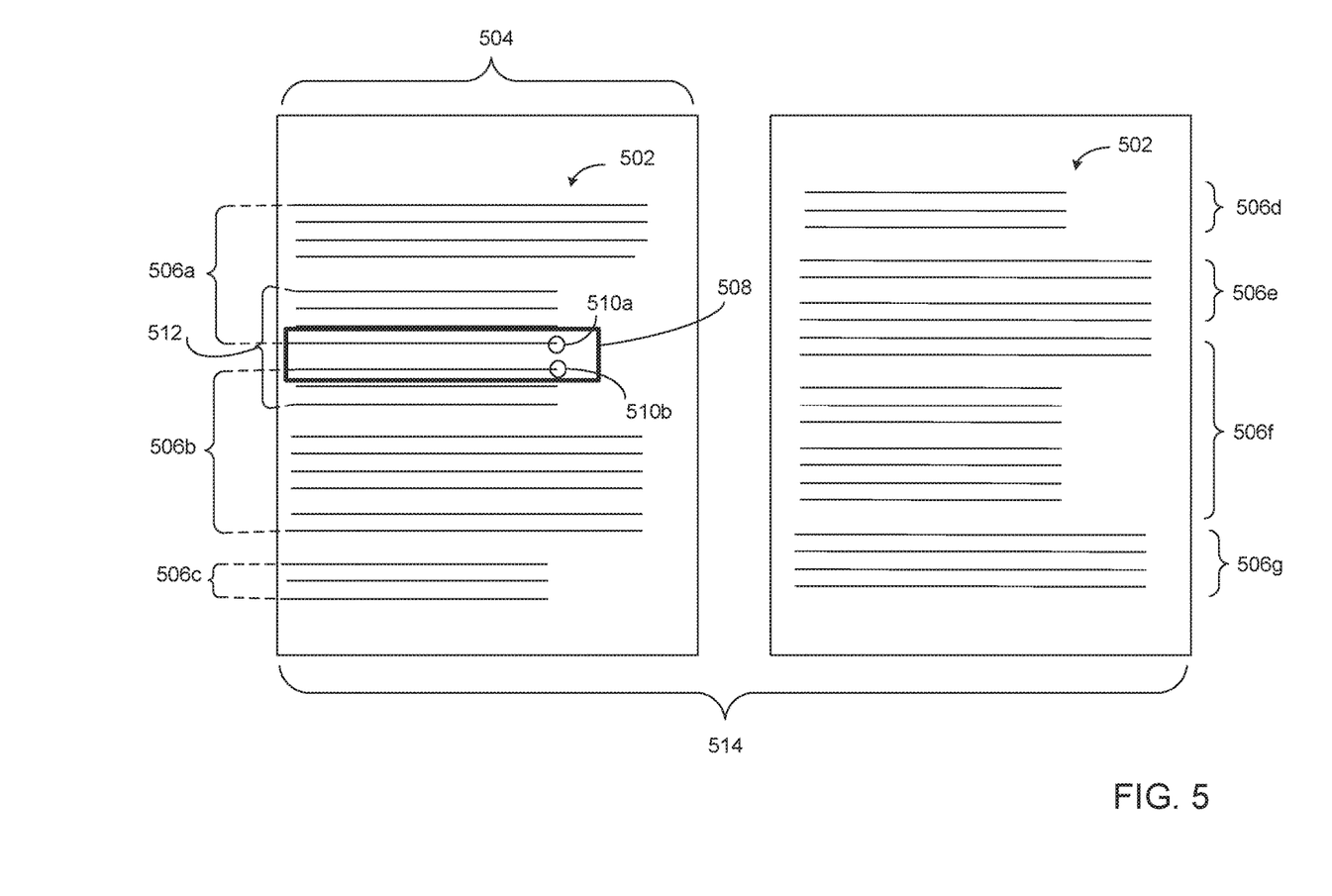
FIG. 5 illustrates an example of determining code complexity scores.
Figure 6A:
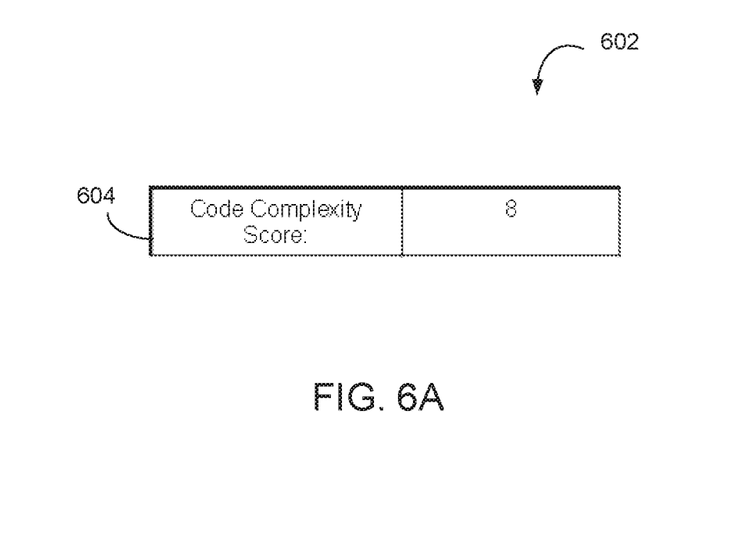
FIG. 6A is an example screenshot illustrating display of a determined code complexity score.
Figure 6B:
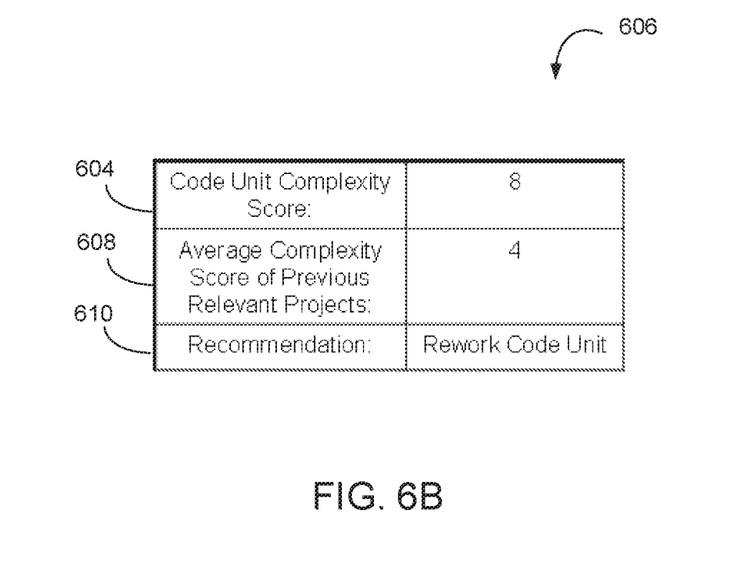
FIG. 6B is an example screenshot illustrating display of a determined code complexity score and a rework recommendation based upon the score.

ILLUSTRATIVE EXAMPLE: FIGS. 5, 6A and 6B illustrate an example of determining code complexity scores. Turning to FIG. 5, in an example, system 102 (FIG. 2) receives, via a network 116 (FIG. 1), code lines 502 for a software program 514, the code lines 502 including a subset unit 504 of code lines. System 102 identifies a plurality of code entities within the unit 504. Each of the code entities includes a line of code, or consecutive lines of code, implementing a distinct program requirement or defect fix for the program. For instance, system 102 may identify within the code unit 504 a first code entity 506a that implements a "Requirement 1", a second code entity 506b that implements a "Requirement 2", and a third code entity 506c that implements a "Requirement 3." System 102 may also identify, outside the code unit 504 but within the totality of lines of code 502 of the program 514, a fourth code entity 506d that implements a "Defect Fix 1", a fifth code entity 506e that implements a "Defect Fix 2", a sixth code entity 506f that implements a "Defect Fix 3", and a seventh code entity 506g that implements a "Requirement 4."

Continuing with the example of FIGS. 5, 6A and 6B, system 102 applies a relevancy filter to identify from the code entities 506a 506b 506c set of relevant entities 506a and 506b. In an example, the relevancy filter may identify the set of relevant entities 506a 506b according to a program release date filter or a program version filter. In another example, the relevancy filter may identify the set of relevant entities 506a 506b according to a program release date filter or a program version filter. In another example, the relevancy filter may identify the set of relevant entities 506a 506b according to a development period filter or a development team filter.

In another example, the relevancy filter may identify the set of relevant entities 506a 506b according to a prescribed functionality filter. For instance, system 102 may in identifying the relevant code entities filter all out all code entities except those that those code entities that implement a certain functionality, e.g. a "shopping cart" functionality for a web application, or an "automatic update" functionality for system software, or a "media handling" program for a printing device's firmware. In yet another example, the relevancy filter may identify the set of relevant entities 506a according to the functionality versus nonfunctionality of the set of entities. As used herein, a "functional" entity refers generally to a code entity that addresses a requirement of a user of a program, or a device that implements the program. As used herein, a "nonfunctional" entity refers generally to a code entity that addresses a requirement of developers of the code versus an end user application. For instance, system 102 may in identifying the relevant code entities filter a code entity 506c that performs a nonfunctional task of "renaming method X."

System 102 identifies context changes within the unit, each context change having an occurrence of a first code line set implementing a relevant entity, adjacent to a second code line set implementing another relevant entity, within a same code scope. In the example of FIG. 5, system 102 identifies context change 508 as there is a first code line set 510a that implements relevant entity 506a, with the first line set 510a being adjacent to the second code line set 510b that implements relevant entity 506b, with the first and second code line sets 510a 510b being included within a same code scope 512. It is important to note that as used herein a "code line set" that implements an entity can be a single line of code, or a consecutive lines of code. As discussed previously, system 102 may, in different examples, determine a "same code scope" considering a same method scope, same class scope, a same loop scope, a same closure scope, or another scope according to a programming language, Continuing with the example of FIGS. 5, 6A and 6B, system 102 determines a code complexity score based upon a formula that includes as factors a count of relevant entities 506a 506b identified within the unit 504, a count of context changes between relevant entities 506a 506b identified within the unit 504, a count of total code lines 502 within the program, and a count of total entities 506a 506b 506c 506d 506e 506f 506g within the program. System 102 may send, or cause the sending, of the determined complexity score to a developer software application or to a developer computing device for display or presentation to a developer user.

FIG. 6A is an example screenshot illustrating a first display 602 of a determined code complexity score 604 via a developer software application or at a display element of a developer computing device. In an example, the first display 602 may be the result of system 102 sending or causing sending of the determined code complexity score 604 to the developer software application or the developer computing device.

FIG. 6B is an example screenshot illustrating a second display 606 of a determined code complexity score 604, a calculated average of previously determined code complexity scores 608, and a rework recommendation 610. The second display 606 may enabled via a developer software application, or at a display element of a developer computing device. In an example, the second display 606 may be the result of system 102 accessing a database that includes previously determined code complexity scores to calculate the average 608, and determining the rework recommendation 608 based upon a comparison of a currently determined complexity score 604 to the previously determined scores.

Figure 7:
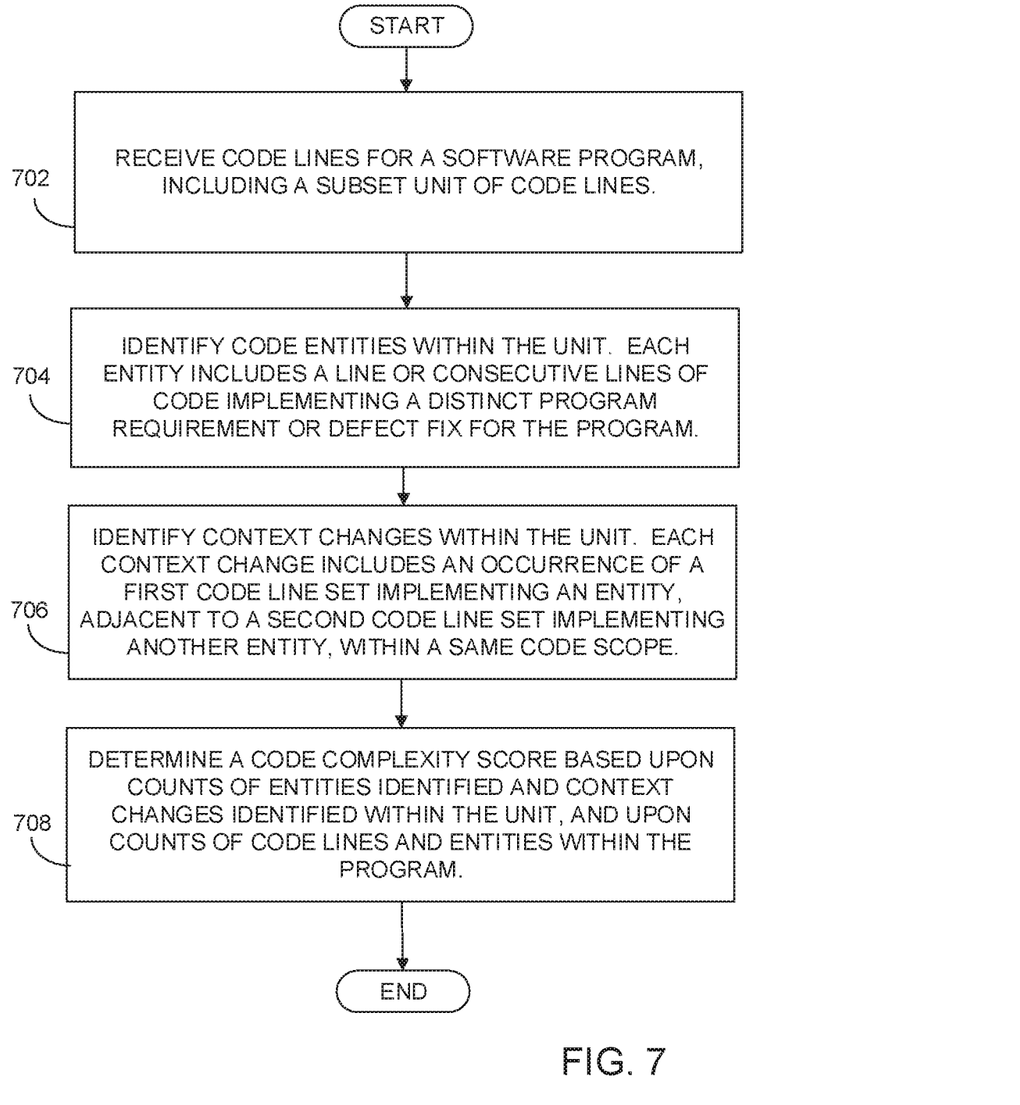
FIG. 7 is a flow diagram depicting steps taken to implement an example.

OPERATION: FIG. 7 is a flow diagram of steps taken to implement a method for determining code complexity scores. In discussing FIG. 7, reference may be made to the components depicted in FIGS. 2 and 4. Such reference is made to provide contextual examples and not to limit the manner in which the method depicted by FIG. 7 may be implemented. Code lines for a software program are received. The code lines include a subset unit of code lines (block 702). Referring back to FIGS. 2 and 4, receipt engine 202 (FIG. 2) or receipt module 406 (FIG. 4), when executed by processing resource 404, may be responsible for implementing block 702.

Code entities are identified within the unit of code lines. Each code entity includes a line or consecutive lines of code that implement a distinct program requirement or defect fix for the program (block 704). Referring back to FIGS. 2 and 4, entity engine 204 (FIG. 2) or entity module 408 (FIG. 4), when executed by processing resource 404, may be responsible for implementing block 704.

Context changes are identified within the unit. Each context change is an occurrence of a first code line set implementing an entity, adjacent to a second code line set implementing another entity, within a same code scope (block 706). Referring back to FIGS. 2 and 4, context change engine 206 (FIG. 2) or context change module 410 (FIG. 4), when executed by processing resource 404, may be responsible for implementing block 706.

A code complexity score is determined based upon a count of entities identified within the unit of code lines, a count of context changes identified within the unit of code lines, a count of code lines in the software program, and a count of code entities within the software program (block 708). Referring back to FIGS. 2 and 4, scoring engine 208 (FIG. 2) or scoring module 412 (FIG. 4), when executed by processing resource 404, may be responsible for implementing block 708.

CONCLUSION: FIGS. 1-7 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 7 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A system, comprising:
a processor; and
a memory storing instructions that when executed by the processor cause the processor to:
receive a unit of code lines of a software program;
identify a plurality of entities within the unit of code lines, wherein each entity includes a set of code lines implementing a distinct program requirement or defect fix for the software program;
identify context changes within the unit of code lines, wherein each context change is an occurrence of a first entity that includes a first code line set implementing a first program requirement or defect fix, adjacent to a second entity that includes a second code line set implementing a second program requirement or defect fix, within a same code scope of the software program;
determine a code complexity score of the unit of code lines based upon a total number of entities identified and a total number of context changes identified within the unit of code lines, and upon total numbers of code lines and entities within the software program; and
generate a recommendation to rework the unit of code lines of the software program based on a comparison of the determined code complexity score and a previously determined code complexity score.

2. The system of claim 1, wherein the code lines of the unit are consecutive code lines.

3. The system of claim 1, wherein, to identify each entity within the unit of code lines, the instructions are to cause the processor to access metadata tags within the unit of code lines to determine a set of code lines that implements a distinct program requirement or defect fix.

4. The system of claim 1, wherein, to identify each entity within the unit of code lines, the instructions are to cause the processor to access comments within the unit of code lines to determine a set of code lines that implements a distinct program requirement or defect fix.

5. The system of claim 1, wherein the instructions are to cause the processor to determine the code complexity score based upon the formula $$\text{code complexity} = (E_n * S_n)/(LOC * E_t)$$

wherein $E_n$ is the total number of the entities identified in the unit of code lines, $S_n$ is the total number of the context changes within the unit of code lines, LOC is the total number of lines of code within the software program, and $E_t$ is the total number of entities within the software program.

6. The system of claim 1, wherein the same code scope is a same scope of method in the software program.

7. The system of claim 1, wherein the same code scope is one of a same class, a same file, a same loop, and a same closure.

8. The system of claim 1, wherein the code complexity score is a first code complexity score, and wherein the instructions are to cause the processor to access a database to obtain the previously determined code complexity score, and determine the recommendation to rework the software program based upon a comparison of the first code complexity score to the previously determined score.

9. The system of claim 1, wherein the instructions are to cause the processor to send the determined code complexity score to a developer software application or developer computing device.

10. A non-transitory computer readable storage medium storing instructions that when executed cause a processing resource to:
receive a unit of code lines of a software program;
identify a plurality of entities within the unit of code lines, wherein each entity includes a set of code lines implementing a distinct program requirement or defect fix for the program, and apply a relevancy filter to identify from the entities a set of relevant entities;
identify context changes within the unit of code lines, wherein each context change is an occurrence of a first one of the relevant entities that includes a first code line set implementing a first program requirement or defect fix, adjacent to a second one of the relevant entities that includes a second code line set implementing a second program requirement or defect fix, within a same code scope of the software program;
determine a code complexity score of the unit of code lines based upon a total number of relevant entities identified and a total number of context changes between relevant entities identified within the unit of code lines, and upon total numbers of code lines and entities within the software program; and
generate a recommendation to rework the unit of code lines of the software program based on a comparison of the determined code complexity score and a previously determined code complexity score.

11. The non-transitory computer readable storage medium of claim 10, wherein the instructions are to cause processing resource to identify the set of relevant entities according to one of a program release date, a program version, a development period, and a development team.

12. The non-transitory computer readable storage medium of claim 10, wherein the instructions are to cause processing resource to identify the set of relevant entities according to functionality of the entities.

13. The non-transitory computer readable storage medium of claim 10, wherein the instructions are to cause processing resource to identify the set of relevant entities according to functionality versus nonfunctionality of the entities.

14. The non-transitory computer readable storage medium of claim 10, wherein the instructions are to cause the processor to determine the code complexity score based upon the formula $$\text{code complexity} = (E_n * S_n)/(LOC * E_t)$$

wherein $E_n$ is the total number of the entities identified in the unit of code lines, $S_n$ is the total number of the context changes within the unit of code lines, LOC is the total number of code lines within the software program, and $E_t$ is the total number of the entities within the software program.

15. The non-transitory computer readable storage medium of claim 10, wherein the determined code complexity score is a first code complexity score, and wherein the instructions are to cause the processing resource to access a database to obtain the previously determined code complexity score, and determine the recommendation to rework the unit of code lines of the software program based upon a comparison of the first code complexity score to the previously determined code complexity score.

16. A method to determine code complexity scores, comprising:

identifying, by a processor of a computing device, a unit of code lines within a software program;

identifying, by the processor, a plurality of entities within the unit of code lines, wherein each entity includes a set of code lines implementing a distinct program requirement or defect fix for the software program;

identifying, by the processor, context changes within the unit of code lines, wherein each context change is an occurrence of a first entity that includes a first code line set implementing a first program requirement or defect fix, adjacent to a second entity that includes a second code line set implementing a second program requirement or defect fix, within a same code scope of the software program;

determining, by the processor, a code complexity score of the unit of code lines based upon a total number of the entities identified and a total number of the context changes identified within the unit of code lines, and upon total numbers of code lines and entities within the software program; and generating, by the processor, a recommendation to rework the unit of code lines of the software program based on a comparison of the determined code complexity score and a previously determined code complexity score.

17. The method of claim 16, wherein the same code scope in the software program is one of a same method, a same class, and a same closure.

18. The method of claim 16, wherein determining the code complexity score is based upon the formula $$\text{code complexity} = (E_n * S_n)/(LOC * E_t)$$

wherein $E_n$ is the total number of the entities identified in the unit of code lines, $S_n$ is the total number of the context changes within the unit of code lines, LOC is the total number of code lines within the software program, and $E_t$ is the total number of the entities within the software program.

19. The method of claim 16, wherein the determined code complexity score is a first code complexity score, and the method further comprising:

accessing a database to obtain the previously determined code complexity score, and determining the recommendation to rework the unit of code lines of the software program based upon a comparison of the first code complexity score to the previously determined code complexity score.

* * * * *